United States Patent
Huang

(10) Patent No.: US 8,014,973 B1
(45) Date of Patent: Sep. 6, 2011

(54) DISTANCE HISTOGRAM FOR NEAREST NEIGHBOR DEFECT CLASSIFICATION

(75) Inventor: Tong Huang, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 539 days.

(21) Appl. No.: 12/202,251

(22) Filed: Aug. 30, 2008

Related U.S. Application Data

(60) Provisional application No. 60/970,577, filed on Sep. 7, 2007.

(51) Int. Cl.
*G06F 19/00* (2011.01)

(52) U.S. Cl. ........... 702/180; 704/270.1; 382/141; 382/149; 382/103; 84/668; 84/609; 84/612; 700/194; 707/999.005

(58) Field of Classification Search ........... 704/270.1; 382/110, 141, 149, 103; 84/668, 609, 611, 84/612; 700/194; 707/999.001, 999.002, 707/999.004, 999.003, 999.005, 999.104, 707/999.107, E17.009; 702/180
See application file for complete search history.

(56) References Cited

U.S. PATENT DOCUMENTS

| | | | | |
|---|---|---|---|---|
| 6,148,097 A * | 11/2000 | Nakayama et al. | ........... | 382/141 |
| 6,697,516 B1 * | 2/2004 | Alexandre | ........... | 382/149 |
| 6,778,694 B1 * | 8/2004 | Alexandre | ........... | 382/141 |
| 7,142,992 B1 | 11/2006 | Huet et al. | | |
| 7,376,672 B2 * | 5/2008 | Weare | ........... | 707/753 |
| 7,840,505 B2 * | 11/2010 | Polyak et al. | ........... | 706/12 |
| 7,864,980 B2 * | 1/2011 | Evans | ........... | 382/103 |
| 2005/0097075 A1 * | 5/2005 | Hoekman et al. | ........... | 707/1 |
| 2006/0111801 A1 * | 5/2006 | Weare et al. | ........... | 700/94 |
| 2006/0233434 A1 * | 10/2006 | Hamamatsu et al. | ........... | 382/149 |
| 2006/0265145 A1 * | 11/2006 | Huet et al. | ........... | 702/35 |
| 2008/0109389 A1 * | 5/2008 | Polyak et al. | ........... | 706/12 |
| 2008/0162384 A1 * | 7/2008 | Kleist et al. | ........... | 706/12 |
| 2008/0195654 A1 * | 8/2008 | Weare | ........... | 707/102 |

* cited by examiner

*Primary Examiner* — Carol Tsai
(74) *Attorney, Agent, or Firm* — Luedeka, Neely & Graham, P.C.

(57) ABSTRACT

A method for constructing a distance histogram for nearest neighbor classification. A training sample is determined for each of two classes. For each defect, a distance is measured in the feature space between the defect and the training sample for each of the classes. All of the distances for a given defect are normalized by dividing each distance for the given defect by the sum of all of the distances for the given defect. A histogram is constructed by plotting a chart of the normalized distances versus the number of defects having the distances. A threshold bar is placed on the center of the histogram to construct a normal nearest neighbor classifier. The threshold bar can be adjusted to the left or to the right to construct a weighted nearest neighbor classifier.

3 Claims, 1 Drawing Sheet

DISTANCE HISTOGRAM FOR NEAREST NEIGHBOR DEFECT CLASSIFICATION

This application claims all rights and priority on U.S. provisional application Ser. No. 60/970,577 filed 2007.09.07. This invention relates to the field of integrated circuits. More particularly, this invention relates to determining defects in integrated circuits during inspection or failure analysis.

FIELD

Background

Classification methods are widely used for binning defects during integrated circuit inspection and analysis. Generally speaking, there are two basic classification methods: rule based classification and statistical classification, such as nearest neighbor classification. A hybrid classification method is comprised of a combination of these two types of classification methods by introducing a tree structure that consists of simple rule nodes and nearest neighbor nodes.

Each classification method type has its own advantages and disadvantages. Rule based classification methods have advantages such as being simple, intuitive and the separability between defects can be visualized by a histogram or some other graphical device. However, they have a disadvantage in that it is hard to build a rule based classification method in a high dimension feature space. Thus, many of the very practical substrate defect classification problems are just too complex to be solved by using simple rule based classification methods, because it is often necessary to build classification methods on a high dimension feature space.

The statistical classification methods, such as nearest neighbor, can easily handle classification in a high dimension feature space and is often used for such. However, one disadvantage of nearest neighbor classification methods is that they are "black" boxes, in that users don't know why they can or can't separate defects or how good the separation between defects is by only looking at numbers such as the misclassification rate and so forth. The performance of nearest neighbor classification methods can only be found in certain numbers such as the misclassification rate, the number of misclassified defects, and so forth. This disadvantage reduces the confidence in using nearest neighbor classification methods to solve defect classification problems.

What is needed, therefore, is a system that overcomes problems such as those described above, at least in part.

SUMMARY

The above and other needs are met by a method for constructing a distance histogram for a nearest neighbor classifier by distances in feature space between defects and training sample defects. A training sample is determined for each of two classes. For each defect, a distance is measured in the feature space between the defect and the training sample for each of the classes. All of the distances for a given defect are normalized by dividing each distance for the given defect by the sum of all of the distances for the given defect. A histogram is constructed by plotting a chart with the normalized distances versus the numbers of defects having the distances. A threshold bar is placed on the center of the histogram to construct a normal nearest neighbor classifier.

The threshold bar can be adjusted to the left or to the right to construct a weighted nearest neighbor classifier.

Thus, the embodiments of the present invention make nearest neighbor classification methods more transparent, by introducing a distance related histogram that depicts the separability of the nearest neighbor classification methods. In addition, the histogram provides users with opportunities to adjust the classification method. This histogram can be applied to either a single nearest neighbor classification method or a nearest neighbor node in a hybrid classification method.

In some embodiments, more than one training samples are determined for two classes, and then the distance in the feature space between the defect and the nearest training sample is measured for each of the classes that have more than one training samples.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

The embodiments of the present invention provide a visualization for a nearest neighbor classification method, to provide users with a more intuitive understanding for the classification method and help build better and more meaningful nearest neighbor classification methods. Thus, the embodiments make nearest neighbor classification methods more transparent, by introducing a distance related histogram that depicts the separability of the nearest neighbor classification methods. In addition, the histogram provides users with opportunities to adjust the classification method. This histogram can be applied to either a single nearest neighbor classification method or a nearest neighbor node in a hybrid classification method.

The complexity of a classification problem is reflected in two important respects: 1) the dimensional degree of the feature space, and 2) the number of classes that are to be classified within the feature space. Each of the features is a characteristic that can be used to describe the defect, such as the size, shape, and brightness of the defect. In that example, those three features represent a feature space with a dimensional degree of three. It is not unusual to define a feature space having a dimensional degree of ten or more. The higher the dimensional degree of the feature space, the more complicated the classification method becomes.

The goal of a classification is to break the feature space into a desired number of classes. In many cases, only two classes are needed. When defining a nuisance filter, for example, one class is a detrimental defect, and the other class is a mere nuisance defect. Sometimes more than two classes are needed. However, the number of classes is typically less than ten. The two-class classifications tend to be the most important, because multiple-class classifications can be decoupled into multiple two-class classifications, where one of the classes represents the attribute under investigation, and the other classes represents everything else.

The embodiments of the invention are directed toward two-class classifications in high dimensional feature space.

By virtue of being a two-class classification, a meaningful distance histogram for a nearest neighbor classifier can be clearly constructed.

Figure 1:
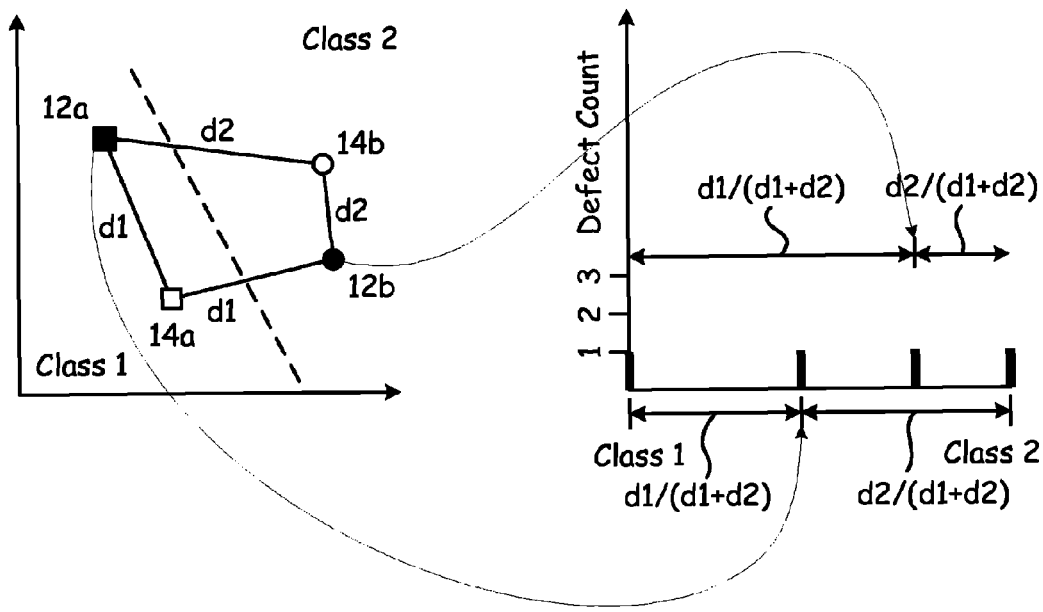
FIG. 1 is a first example of a nearest neighbor classification method according to an embodiment of the present invention.

FIG. 1 depicts a nearest neighbor distance histogram for a two-class classification problem. As depicted in the chart on the left side of FIG. 1, there are two training samples 14a and 14b that belong to class 1 and class 2, respectively. Training samples are depicted as elements with a white fill. Elements belonging to class 1, such as training sample 14a, are depicted as squares. Elements belonging to class 2, such as training sample 14b, are depicted as circles. For any given defect 12a and 12b, d1 is the distance between the defect 12 and the training sample 14a of class 1, and d2 is the distance between the defect 12 and the training sample 14b of class 2, where d1 and d2 are distances in multiple-dimension space. Defects are depicted as elements with a black fill. After normalization (dividing by (d1+d2) in the present example), these distances are mapped into a histogram as depicted on the right side of FIG. 1. If there are multiple training samples 14 per class, then d1 and d2 are the shortest distances between the defect 12 and the training samples 14 of the corresponding classes.

Figure 2:
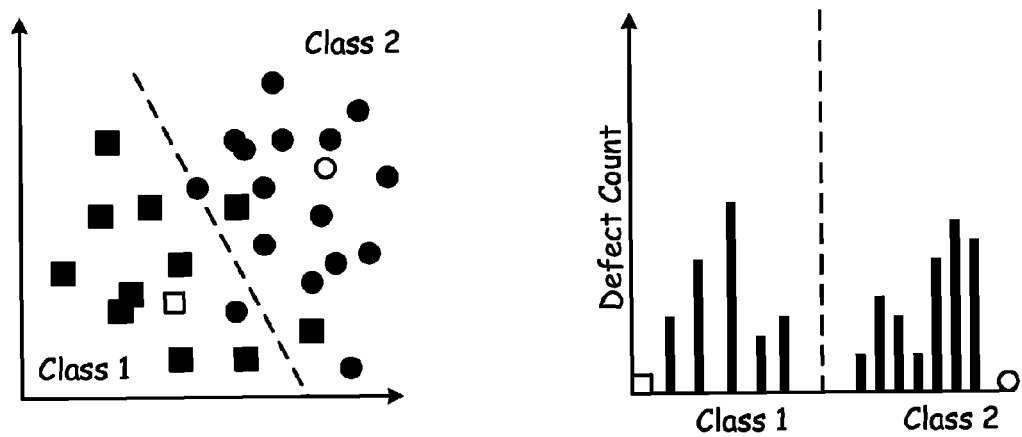
FIG. 2 is a second example of a nearest neighbor classification method according to an embodiment of the present invention.

FIG. 2 depicts a second example with multiple defects. The histogram in this example shows the defect distribution and visualizes the separability of this nearest neighbor classification method. The performance of the nearest neighbor classification method is determined by the threshold bar in the middle of the histogram. The defects on the left side (in this example) are classified as class 1 and those on the right side are classified as class 2. The threshold bar can be moved to the right or to the left to adjust the classification performance.

When training samples are selected, the nearest neighbor distance histogram is created using the distance ratio, as explained above. The defect distribution for both classes can be clearly seen in the histogram. The "normal" nearest neighbor classifier places the threshold bar at the center of the histogram as a default condition. All the defects on the left side of the threshold bar are classified as class 1, and all of the defects on the right side of the threshold bar are classified as class 2. Often, however, all of the defects are not of equal importance. For example, class 1 defects might be important key defects that affect the viability of the device, while the class 2 defects are merely nuisance defects. It would be imprudent to lose any of the key class 1 defects. Thus, the threshold bar can be moved to right to keep all of the class 1 defects classified correctly. In such an embodiment the nearest neighbor classification is designated as a weighted nearest neighbor classification. Moving the threshold bar in this manner is equivalent to adding a weight to the value of d1. This means that a defect with a smaller distance to the class 2 training sample can be classified to class 1, when the weighted distance to class 1 is smaller.

The embodiments of the present invention have the following novel features that are not disclosed in the prior art, in that they: (1) visualize a high dimension feature space using the nearest neighbor classification method on a one dimension histogram; (2) enable an easier understanding of the separability and even the robustness of a nearest neighbor classification method; (3) are adjustable through a threshold bar that provides more flexibility to weighting a desired class; (4) make users more comfortable in using a nearest neighbor classification method, similar to as if they had built a classification method with a single feature and a single cut.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for constructing a distance histogram for a nearest neighbor classification by distances in feature space between defects and training sample defects, the method comprising the steps of:

defining a feature space, determining a training sample defect for each of two classes, for each of defects, measuring a distance in the feature space between the defect and the training sample defect for each of the two classes, normalizing all of the distances for a given defect by dividing each distance for the given defect by the sum of all of the distances for the given defect, and creating a histogram by plotting a chart with the normalized distances versus the number of defects having the distances, placing a threshold bar at the center of the histogram to construct a normal nearest neighbor classifier.

2. The method of claim 1, further comprising:

in the step of determining a training sample for each of the classes, determining more than one training samples for two classes, and in the step of measuring a distance in the feature space between the defect and the training sample for each of the classes, measuring a distance in the feature space between the defect and the nearest training sample for each of the classes that has more than one training samples.

3. The method of claim 1, further comprising adjusting the threshold bar to right or left in the histogram to accentuate one of the classes, by weighting the normalized distance for the associated one of the classes.

* * * * *